US006269383B1

(12) United States Patent
Sabin et al.

(10) Patent No.: US 6,269,383 B1
(45) Date of Patent: Jul. 31, 2001

(54) METHOD AND APPARATUS FOR INTEGER ARITHMETIC

(75) Inventors: Michael J. Sabin, Sunnyvale; Mark W. Heising, Palo Alto, both of CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 09/437,071

(22) Filed: Nov. 9, 1999

Related U.S. Application Data

(62) Division of application No. 08/979,803, filed on Nov. 26, 1997, now Pat. No. 6,026,421.

(51) Int. Cl.[7] ........................................................ G06F 7/38
(52) U.S. Cl. .............................................. 708/490; 708/523
(58) Field of Search .................................... 708/490, 523, 708/524, 603, 620, 225, 491

(56) References Cited

U.S. PATENT DOCUMENTS

| 4,215,617 | * | 8/1980 | Moorer | 84/623 |
|---|---|---|---|---|
| 4,608,634 | * | 8/1986 | Caudel et al. | 708/523 |
| 4,771,379 | | 9/1988 | Ando et al. | 364/200 |
| 5,194,681 | * | 3/1993 | Kudo | 84/603 |
| 5,278,781 | | 1/1994 | Ando et al. | 364/736 |
| 5,280,439 | | 1/1994 | Quek et al. | 364/760 |
| 5,321,751 | | 6/1994 | Iwamura et al. | 380/24 |
| 5,457,804 | | 10/1995 | Ohtomo et al. | 395/800 |
| 5,661,673 | | 8/1997 | Davis | 364/760.01 |

* cited by examiner

*Primary Examiner*—Ohuong Dinh Ngo
(74) *Attorney, Agent, or Firm*—David Newman Chartered

(57) ABSTRACT

A system and method for performing multiplication and modular reduction of large integers. The system includes at least one large integer unit, each large integer unit having a multiplier, an adder, and a register. First and second multiplier inputs are applied to the multiplier, and first and second adder inputs are applied to the adder. One output of the multiplier is also applied to the adder. A plurality of large integer units may be connected into a large integer unit array that includes a complementing gate and a latching register. A second output of the multiplier is applied to the first adder input of a next large integer unit, with processing speed increasing as additional large integer units are added to the array.

6 Claims, 9 Drawing Sheets

METHOD AND APPARATUS FOR INTEGER ARITHMETIC

RELATED PATENT

This patent stems from a divisional patent application of U.S. patent application Ser. No. 08/979,803, filed Nov. 26, 1997, now U.S. Pat. No. 6,026,421 entitled APPARATUS FOR MULTIPRECISION INTEGER ARITHMETIC. The benefit of the earlier filing date of the parent patent application is claimed for common subject matter pursuant to 35 U.S.C. § 120.

BACKGROUND OF THE INVENTION

The present invention relates to arithmetic computation involving large integers, and more particularly, to a means for performing multiplication and modular reduction of large integers.

DESCRIPTION OF THE RELEVANT ART

The present invention is motivated by applications of public-key cryptography including the RSA scheme, RSA Laboratories, "The Public-Key Cryptography Standards," RSA Data Security, Inc., Redwood City, Calif., November 1993; the Diffie-Hellman scheme, W. Diffie and M. Hellman, "New Directions in Cryptography," *IEEE Transactions on Information Theory*, Vol. IT-22, No. Jun. 6, 1977, pp. 74–84; and the DSA scheme, "Digital Signature Standard," FIPS Publication 186, National Institute of Standards and Technology, U.S. Department of Commerce, May 18, 1994. These applications require the computational step of modular exponentiation, that is, a computation of the form "$A^B$ modulo P," where A, B, and P are large integers. Modular exponentiation is a computationally demanding procedure that can take a long time to perform, especially on inexpensive computing devices.

Computing devices typically are designed to process data in basic units of a fixed size. The basic data unit is called a "word" and comprises "b" bits. The value of b is selected when the device is designed. Typical values for b are 8, 16, 32, or 64 bits. A word is used to represent a non-negative integer x in the range $0 \leq x \leq W-1$, where $W=2^b$.

To represent an integer X that is larger than W−1, a multiprecision representation is used. If $0 \leq X \leq W^n - 1$, where n is some positive integer, then X can be represented as:

$$X = x\{n-1\}*W^{n-1} + x\{n-2\}*W^{n-2} \ldots + x\{1\}*W + x\{0\},$$

where each $x\{j\}$ is in the range $0 \leq x\{j\} \leq W-1$, $j=0, 1, \ldots, n-1$. Thus, the integer X is represented by the n words $x\{0\}, x\{1\}, \ldots, x\{n-1\}$, with word $x\{j\}$ representing an integer that is the coefficient of $W^j$. For a given word size b, and a given number of words n, the multiprecision representation of X is unique.

Modular exponentiation requires several operations involving multiprecision integers. One such operation is multiplication. Given two integers X and Y, each with a multiprecision representation of n words, it is straightforward to program the computing device to calculate the product $Z=X*Y$. The procedure is little more than the "multiply and add" method taught in grammar school for multiplying multidigit numbers. The complexity of the procedure is quadratic, that is, the number of "inner products" that must be computed is $n^2$. The product Z requires 2n words to represent it.

In practical public key applications, a single modular exponentiation requires hundreds or thousands of such multiplications, each involving integers that are tens or hundreds of words long. On a simple computing device, the computation time for a single exponentiation can be several minutes. For many applications, such as electronic commerce, this is too long to be useful.

Multiplication is not the only operation involved in modular exponentiation. Another operation is modular reduction, that is, the reduction of the product Z from 2n words to n words by applying a "modulo P" operation. The complexity of modular reduction is nearly identical to that of multiplication, and the two contribute nearly equally to the total run time of a modular exponentiation.

SUMMARY OF THE INVENTION

The present invention takes advantage of the observation that both multiprecision multiplication and modular reduction can be rapidly calculated if the computing device has the capability to efficiently carry out the following operation:

$$Z - Z \pm (X*Y).$$

In this operation, X is an integer represented by m words, and Y and Z are each integers represented by n words. The intent is that n is the number of words in the modulus for which the modular exponentiation is being computed, while m is a smaller value than n. Multiprecision multiplication and modular reduction can each be carried out using approximately n/m executions of this operation, for a total of 2n/m operations for the modular exponentiation.

The present invention discloses a coprocessor that can be added to a computing device to enable the computing device to perform this operation efficiently. When instructed by the computing device to do so, the coprocessor performs the operation $Z-Z\pm(X*Y)$, reading the words of X, Y, and Z from memory, and writing the new words of Z back to memory. The computing device assembles these operations into multiprecision multiplication, modular reduction, and ultimately, modular exponentiation.

The building block for the coprocessor is a large integer unit (LIU). The coprocessor contains one or more LIU's, each identical to each other. Each LIU includes a multiplier, an adder, a register and an OR gate. Multiple LIU's may be connected to form an LIU Array which includes a complementing gate, a latching register, and an output gate. The greater the number of LIU's included in the array, the faster the exponentiation.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
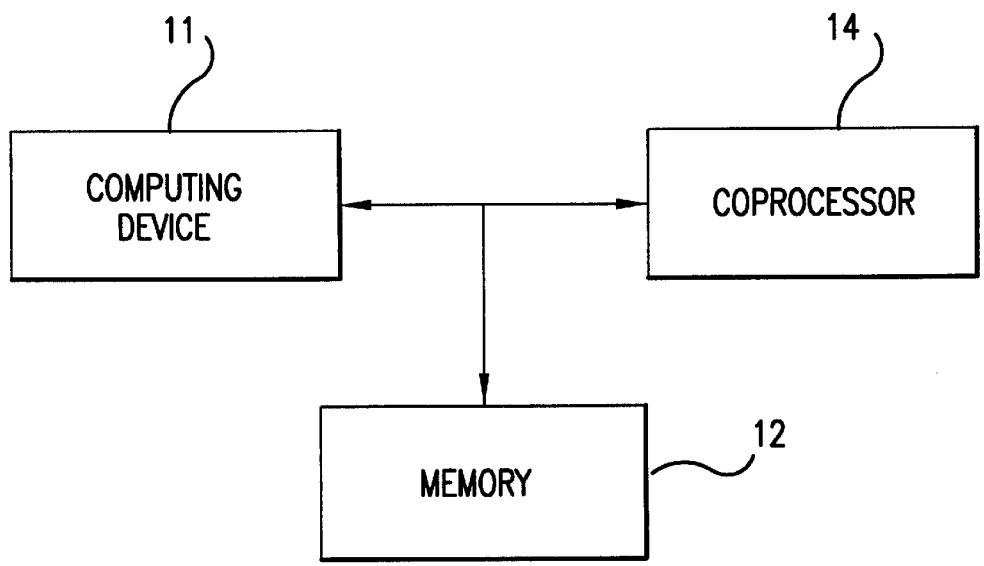
FIG. 1 shows a coprocessor with a computing device.

Reference now is made in detail to the present preferred embodiments of the invention, examples of which are illustrated in the accompanying drawings, wherein like reference numerals indicate like elements throughout the several views.

Throughout this discussion, the notation "X~n words" is used to indicate that an integer X is represented using a multiprecision representation in the format just described.

It is also convenient to introduce a few operators. The operator "/" is used to represent integer division with the remainder discarded. The operator "%" is used to represent the integer modulus operation, i.e., the remainder that results from division. With this notation, $X/W = x\{n-1\}*W^{n-2} + x\{n-2\}*W^{n-3} \ldots + x\{2\}*W + x\{1\}$, and $X \% W = x\{0\}$.

The present invention discloses a coprocessor that can be added to a computing device to enable the computing device to perform this operation efficiently. The arrangement of the coprocessor 14 with the computing device 11 is shown in FIG. 1. The coprocessor 14 shares the bus that the computing device uses to communication with its memory 12. The bus matches the word size b of the computing device. When instructed by the computing device to do so, the coprocessor performs the operation $Z=Z \pm (X*Y)$, reading the words of X, Y, and Z from memory 12, and writing the new words of Z back to memory 12. The computing device assembles these operations into multiprecision multiplication, modular reduction, and ultimately, modular exponentiation.

Figure 2:
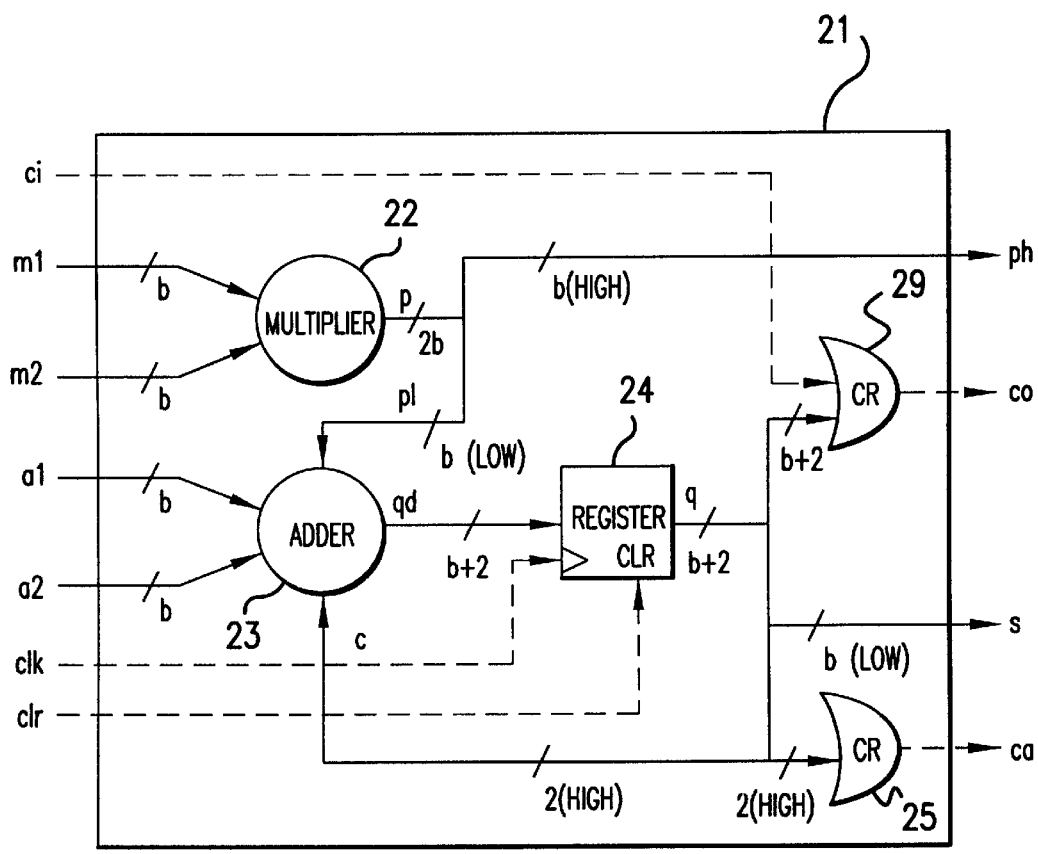
FIG. 2 illustrates a large integer unit (LIU)

FIG. 2 illustrates a large integer unit (LIU) 21. The coprocessor 14 contains m LIU's, each identical to each other. The number of LIU's determines the number of words in the operand X of the operation $Z=Z \pm (X*Y)$. The execution time of modular exponentiation is approximately proportional to 1/m. The system designer is presented with a scaleable architecture that allows the tradeoff of complexity versus speed: the more LIU's, the faster the exponentiation.

Large Integer Unit (LIU)

With reference to the large integer unit (LIU) 21 shown in FIG. 2, signals which are one bit wide are shown as dashed lines, while signals which are more than one bit wide are shown as solid lines, with the number of bits indicated. The number of bits may be different in alternative embodiments and the present invention is intended to include such alternative embodiments.

First multiplier input, m1, and second multiplier input, m2, are multiplicand inputs to the large integer unit 21. Each of the first multiplier input, m1, and the second multiplier input, m2, is a word representing a b-bit integer. First multiplier input, m1, and second multiplier input, m2, are fed to a multiplier 22 that produces the product signal p=m1*m2, where "*" indicates multiplication.

Since $0 \leq m1 \leq (W-1)$ and $0 \leq m2 \leq (W-1)$, the range of product signal p is $0 \leq p \leq (W-1)^2$. This means that 2b bits are required to represent product signal p. The product signal, p, is partitioned into a high part-product signal, ph, and a low part-product signal, pl. The high part-product signal, ph, is formed as the upper b bits of product signal p, and the low part-product signal, pl, is formed as the lower b bits. Thus, $p=ph*W+pl$, where $0 \leq ph \leq (W-1)$ and $0 \leq pl \leq (W-1)$. The high part-product signal, ph, is an output signal of the large integer unit 21, while the low part-product signal, pl, is used internally.

First adder signal, a1, and second adder signal, a2, are adder inputs to the large integer unit 21. Each is a word representing a b-bit integer. First adder signal, a1, and second adder signal, a2, are fed to an adder 23. The adder 23 also receives the low part-product signal, pl, and carry signal, c, a 2-bit value. The adder 23 produces the first sum signal, qd, where qd=a1+a2+pl+c. The largest possible value for the first adder signal, a1, second adder signal, a2, or the low part-product signal, pl, is W−1. The largest possible value for the carry signal, c, is 3. Thus, the largest possible value for the first sum signal, qd, is $3*(W-1)+3=3W$, meaning b+2 bits are required to represent the sum signal, qd.

The first sum signal, ad, at the output of the adder 23 is latched into a register 24. The register 24 is b+2 bits wide. The value of the first sum signal, qd, is transferred to the output of the register 24 when the clock, clk, input to the large integer unit 21 is pulsed. The output of the register 24 is second sum signal, q. The value of the second sum signal, q, remains in place until the next time the clk input is pulsed, or until the clear, clr, input of the large integer unit 21 is pulsed.

The register 24 can be cleared by pulsing the clr input signal of the large integer unit 21. When the clr input is pulsed, the output bits of the register 24 are cleared to 0. The output remains at 0 until the next time the clk input is pulsed, at which time the value of the first sum signal, qd, is transferred to the output.

The second sum signal, q, at the output of the register 24 is partitioned into a carry signal, c, and a sum signal, s. The carry signal, c, is formed as the upper two bits of the second sum signal, q, while the sum signal, s, is formed as the lower b bits. Thus $q=cW+s$, with $0 \leq s \leq W-1$, and $0 \leq c \leq 3$. The sum signal, s, is an output signal of the large integer unit 21.

A carry input signal, ci, is the carry input to the large integer unit 21, and a carry output signal, co, is the carry output. Each is a 1-bit value. The carry output signal co, using OR gate 29, is computed as the logical-OR of the carry input signal, ci, and the bits that make up the second sum signal, q. In other words, the carry output signal, co, has value 0 if the carry input signal, ci, is 0 and each bit of the second sum signal, q, is 0; otherwise, the carry output signal, co, has value 1.

The auxiliary carry signal, ca, using OR gate 25, is computed as the logical-OR of the two bits that make up the carry signal, c. In other words, the auxiliary carry signal, ca, has value 0 if each bit of the carry signal, c, is 0; otherwise, the auxiliary carry signal, ca, has value 1.

LIU Array

Description

Figure 3:
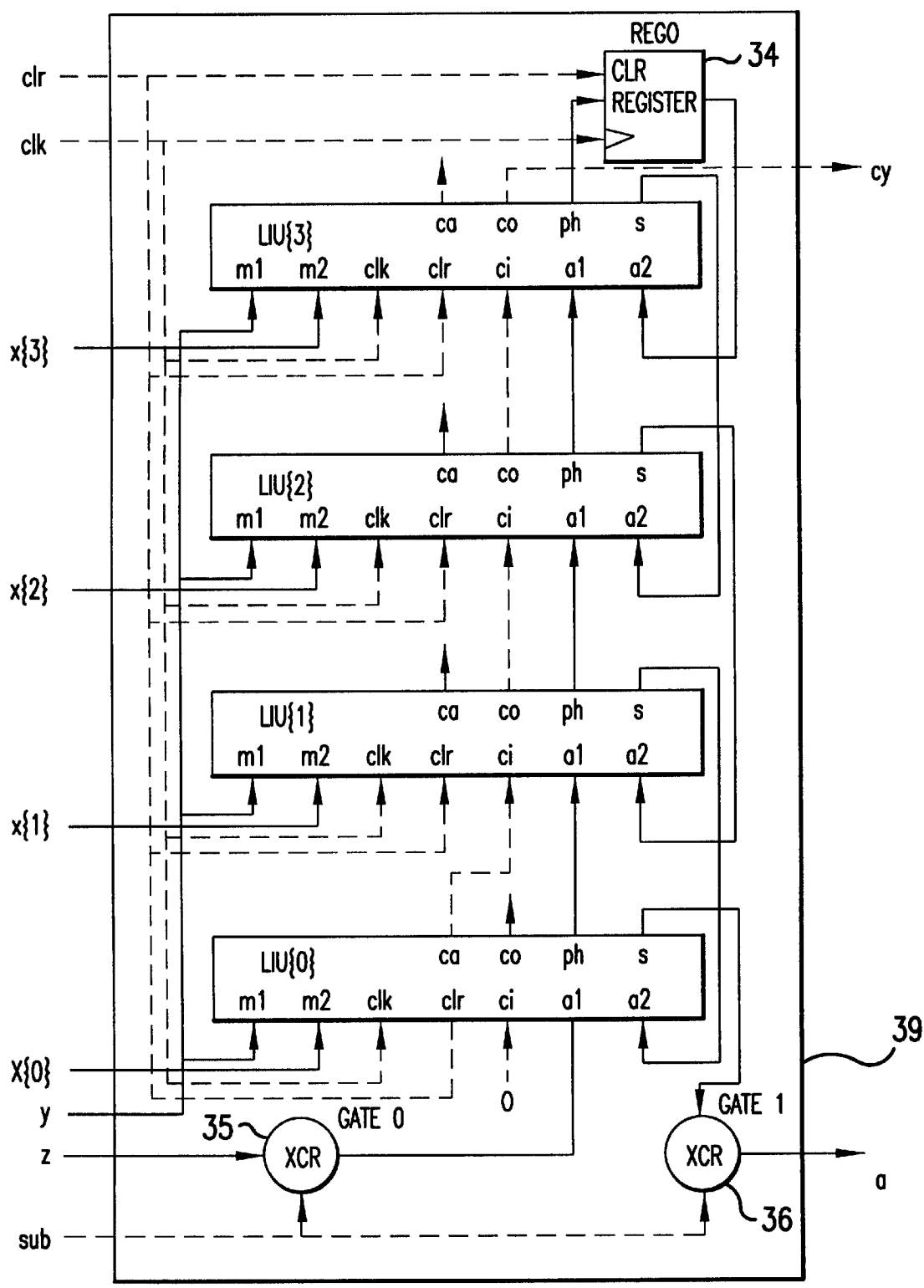
FIG. 3 is a block diagram illustrating four LIU's interconnected to form an LIU array.

As shown in FIG. 3, several large integer units may be interconnected to form an LIU Array. Alternatively, an LIU array may include only one LIU. In FIG. 3, each signal is either one bit or b bits wide. Signals which are one bit wide are shown as dashed lines, while signals which are b bits wide are shown as solid lines.

Figure 4:
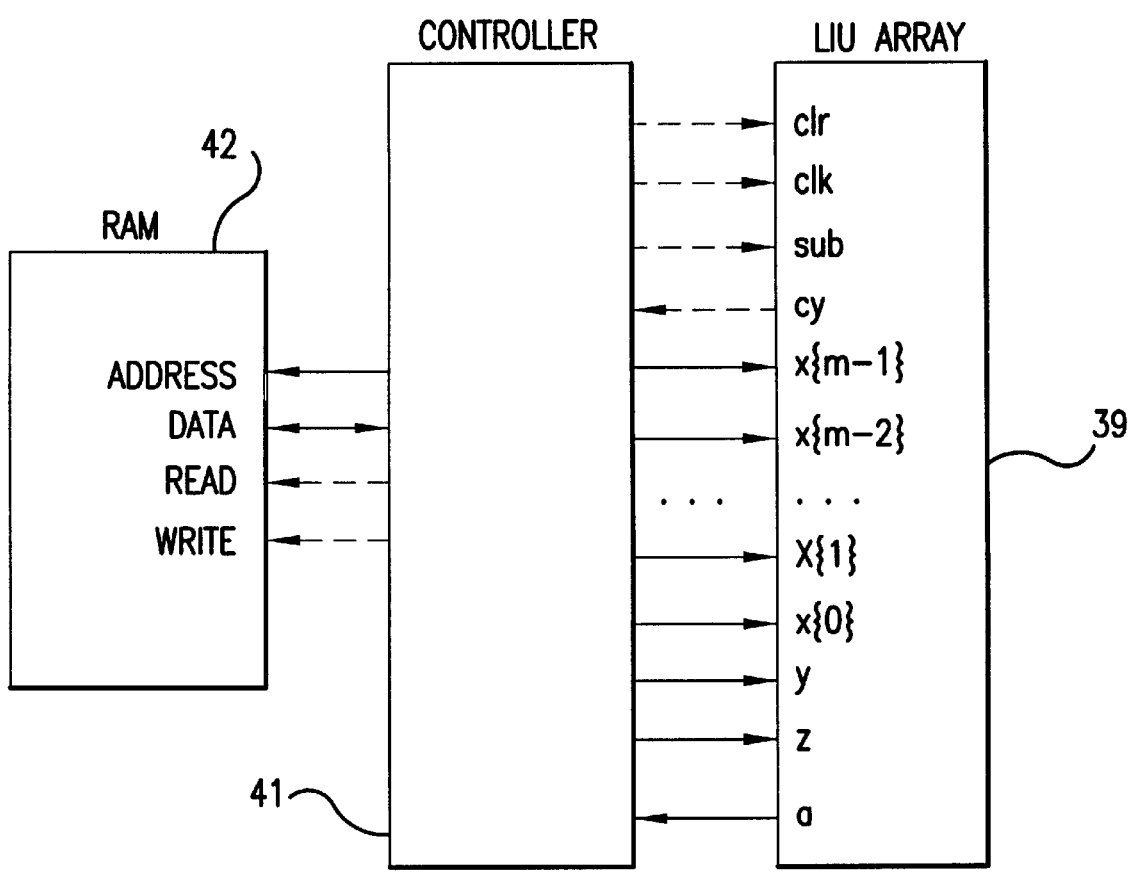
FIG. 4 illustrates an LIU array combined with a controller and random access memory (RAM)

FIG. 3 illustrates the case of four large integer units, LIU{0}, LIU{1}, LIU{2}, LIU{3}, being interconnected to form an LIU Array 39. In general, any number of large integer units can be interconnected. For simplicity, the discussion here first considers the case of four large integer units, as shown in FIG. 4, and then is generalized to the case of other numbers of large integer units.

First data signal, y, is an input to the LIU Array 39, and is applied to the first multiplier input, m1, of each large integer unit, LIU{0}, LIU{1}, LIU{2}, LIU{3}.

The second data signal has a plurality of elements, x{0}, x{1}, x{2}, and x{3}. Each element is respectively connected to the second multiplier input, m2, of each large integer unit of the LIU Array 39, i.e., each element is connected to the second multiplier input, m2, of LIU{0}, LIU{1}, LIU{2}, and LIU{3}, respectively.

The third data signal, z, is an input to the LIU Array 39, and is connected to the input of complementing gate 35. The complementing gate 35 is an exclusive-or (XOR) gate, GATE0, combining each bit of the third data signal, z, with the subtract signal; the subtract signal itself is an input signal to the LIU Array 39. When the subtract signal is inactive, logical 0, the bits of the third data signal, z, are unaffected as they pass through the complementing gate 35. When the subtract signal is active, logical 1, each bit of the third data signal, z, is replaced by its logical complement as the bit passes through the complementing gate 35; that is, a 1-bit is replaced by a 0-bit, and vice-versa. The output of complementing gate 35 is connected to the first adder input, a1, of the first large integer unit, LIU{0}.

Output signal, a, is an output of the LIU Array 39, and is taken from the output of output gate 36. The output gate 36 is an exclusive-or (XOR) gate, GATE1, that combines each bit of the sum signal, s, output of the first large integer unit, LIU{0}, with the subtract signal. When subtract signal is inactive, the bits of the sum signal, s, of the first large integer unit are unaffected as they pass through the output gate 36. When the subtract signal is active, each bit of the sum signal, s, of the first large integer unit is replaced by its logical complement.

A latching register 34 is a register, REG0, that is b bits wide. The input of the latching register 34 is connected to the high part-product signal, ph, output of the fourth large integer unit, LIU{3}, and the output of the latching register 34 is connected to the second adder signal, a2, input of the fourth large integer unit, LIU{3}. Thus, the latching register 34 latches the value of the high part-product signal, ph, from the fourth large integer unit prior to a clock pulse and feeds the value back to the second adder signal, a2, input of the fourth large integer unit after the clock pulse. The latching register 34 has a clear, clr, input that operates identically to the clr input of the register 24 in a large integer unit 21 of FIG. 2.

A clock signal, clk, is an input to the LIU Array 39, and is connected to the clk input of each large integer unit, LIU{0}, LIU{1}, LIU{2}, LIU{3}, and to the clk input of the latching register 34. When the clock input is pulsed, the contents of the register in each large integer unit and the contents of the latching register 34 are simultaneously updated.

The clear signal, clr, is an input to the LIU Array 39, and is connected to the clr input of each large integer unit, LIU{0}, LIU{1}, LIU{2}, LIU{3}, and to the clr input of the latching register 34. When the clear input is pulsed, the contents of the register in each large integer unit and the contents of the latching register 34 are simultaneously cleared to 0.

The carry flow signal, cy, is an output of the LIU Array 39, and is connected to the co output of the fourth large integer unit, LIU{3}. The carry flow signal indicates whether overflow or underflow has occurred.

To interconnect more than four large integer units into an LIU Array, the interconnection logic of the third large integer unit is replicated. Table 1, below, details the logic for interconnecting m large integer units into an LIU Array, where $m \geq 4$:

TABLE 1

$m \geq 4$

| LIU{k}: signal | k = 0 | k = 1 | k = 2, 3, ..., m−2 | k = m−1 |
|---|---|---|---|---|
| m1 | y | y | y | y |
| m2 | x{0} | x{1} | x{k} | x{m−1} |
| ci | Logical 0 | LIU{0}:ca | LIU{k−1}:co | LIU{m−2}:cc |
| a1 | GATE0:output | LIU{0}:ph | LIU{k−1}:ph | LIU{m−2}:ph |
| a2 | LIU{1}:s | LIU{2}:s | LIU{k+1}:s | REG0:output |
| ca | LIU{1}:ci | N/C | N/C | N/C |
| co | N/C | LIU{2}:ci | LIU{k+1}:ci | cy |
| ph | LIU{1}:a1 | LIU{2}:a1 | LIU{k+1}:a1 | REG0:input |
| s | GATE1:input | LIU{0}:a2 | LIU{k−1}:a2 | LIU{m−2}:a2 |

In Table 1: the notation "LIU{k}:x" means signal x of LIU{k}, "REG0:x" means signal x of REG0, etc.; and "N/C" means the signal is unconnected. The leftmost column identifies a signal in a $k^{th}$ large integer unit, LIU{k}, and the subsequent columns show the interconnection logic for that signal for k=0, 1, ..., m−1. As can be seen, the entries in Table 1 match the interconnection logic shown in FIG. 3 when m=4.

To interconnect fewer than four large integer units into an LIU Array, the interconnection logic of some of the large integer units is condensed. Tables 2, 3 and 4 detail the logic for interconnecting m large integer units into an LIU Array for the case of m=3, m=2, and m=1, respectively.

TABLE 2 m = 3

| LIU{k} signal | k = 0 | k = 1 | k = 2 |
|---|---|---|---|
| m1 | y | y | y |
| m2 | x{0} | x{1} | x{2} |
| ci | Logical 0 | LIU{0}:ca | LIU{1}:co |
| a1 | GATE0:output | LIU{0}:ph | LIU{1}:ph |
| a2 | LIU{1}:s | LIU{2}:s | REG0:output |
| ca | LIU{1}:ci | N/C | N/C |
| co | N/C | LIU{2}:ci | cy |
| ph | LIU{1}:a1 | LIU{2}:a1 | REG0:input |
| s | GATE1:input | LIU{0}:a2 | LIU{1}:a2 |

TABLE 3 m = 2

| LIU{k} signal | k = 0 | k = 1 |
|---|---|---|
| m1 | y | y |
| m2 | x{0} | X{1} |
| ci | Logical 0 | LIU{0}:ca |

TABLE 3-continued

| | m = 2 | |
|---|---|---|
| LIU{k} signal | k = 0 | k = 1 |
| a1 | GATE0:output | LIU{0}:ph |
| a2 | LIU{1}:s | REG0:output |
| ca | LIU{1}:ci | N/C |
| co | N/C | cy |
| ph | LIU{1}:a1 | REG0:input |
| s | GATE1:input | LIU{0}:a2 |

TABLE 4

| | m = 1 |
|---|---|
| LIU{k} signal | k = 0 |
| m1 | y |
| m2 | x{0} |
| ci | Logical 0 |
| a1 | GATE0:output |
| a2 | REG0:output |
| ca | cy |
| co | N/C |
| ph | REG0:input |
| s | GATE1:input |

The LIU Array signals which do not appear in Tables 2–4 have the same interconnection logic for any value of m. For completeness, Table 5 details those signals.

TABLE 5

| Signal | Connections |
|---|---|
| clr | REG0:clr and LIU{k}:clr, k = 0, 1, . . ., m-1 |
| clk | REG0:clk and LIU{k}:clk, k = 0, 1, . . ., m-1 |
| z | GATE0:input |
| sub | GATE0:input, GATE1:input |
| a | GATE1:output |

Operation

The general function performed by the LIU Array is the following:

$$A \sim Z \pm (X*Y),$$

where: X~m words; Y~n words; Z~n words; and A~n words.

Integers X, Y, and Z are the input operands to the function, and integer A is the output operand. The words of X are applied to the LIU Array simultaneously, at inputs x{0}, x{1}, . . . , x{m-1}. The words of Y and Z are applied to the LIU Array one word at a time, at inputs y and z, respectively. The words of A are read out of the LIU Array one word at a time, at output a.

The subtract input to the LIU Array selects addition versus subtraction in the "±" operation. Activating the subtract input, i.e., setting the subtract input to logical 1, selects subtraction, while deactivating the subtract input, i.e., clearing the subtract input to logical 0, selects addition.

The carry flow signal, cy, of the LIU Array indicates whether or not overflow or underflow occurs. Overflow occurs during the addition operation if the computed value is too large for an n-word representation. Underflow occurs during the subtraction operation if the computed value is negative. At the end of the operation, the carry flow signal, cy, output is active if either overflow or underflow has occurred. If neither overflow nor underflow has occurred, the carry flow signal, cy, output is inactive.

The LIU Array may be used to perform the general function using the following procedure:

1. Pulse clr.
2. Activate or deactivate signal sub.
3. Apply data inputs x{0}, x{1}, . . . , x{m-1}.
4. For j=0, 1, . . . , n-1, do:
   a. Apply data input y.
   b. Apply data input z.
   c. Pulse clk.
   d. Read data output a.

Step 1 clears the LIU registers and the latching register 34 (REG0). This clears any accumulation from previous operations.

Step 2 selects addition versus subtraction in the "±" operation. An inactive value for the subtract input selects addition, while an active value selects subtraction.

Step 3 applies the values of the words of the X operand. These values remain applied for the entire procedure.

Step 4 controls a loop that executes n times. Each iteration is numbered with an index j, j=0, 1, . . . , n−1.
   In step 4a, word j of operand Y is applied.
   In step 4b, word j of operand Z is applied.
   In step 4c, signal clk is pulsed. This updates the LIU registers and the latching register 34 (REG0) with new values, and makes a new word available at output a.
   In step 4d, word j of operand A is read out.

Analysis of Clocking LIU Array

The operation of the LIU Array may be analyzed for a single cycle, that is, for a single pulsing of the clock input signal. By way of example, the case of an array made up of four LIU's will be used. It will be obvious how to generalize the analysis to any other number of LIU's.

For the present discussion, only the case when the subtract input signal to the LIU Array is inactive will be analyzed. The case of an active subtract signal will be analyzed later.

With reference to FIG. 3 and FIG. 2, an integer Q is defined having value $Q=q\{0\}+q\{1\}W+q\{2\}W^2+q\{3\}W^3+rW^4$, where q{j} is the value stored in the register of LIU{j}, and r is the value stored in the register REG0 of the LIU Array. Each q{j} is made up of b+2 bits, and $W=2^b$.

When the clock signal is pulsed, the value of Q changes. The new value may be called $Q^+$. The value of $Q^+$ is derived from the output of the adder in each LIU and from the output of the multiplier in LIU{3}. Superposition can be used to determine the value of $Q^+$, as follows.

First assume that the value of Q is 0 and the value of input signal y is 0. In this case, the only contribution to $Q^+$ is the input signal, z. The value of z propagates through the adder in LIU{0} and appears at the register output of LIU{0}. Each other register in the LIU Array has an output value of 0. Thus, in this case:

$$Q^+ = z. \qquad (i)$$

Next, assume the value of Q is 0 and the value of z is 0. In this case, the contribution to $Q^+$ is from the output of the multiplier in each LIU. The low part of the multiplier output contributes to the register in the same LIU. The high part of the multiplier output contributes to the register in the next higher LIU, or in the case of the multiplier in LIU{3}, to REG0. Thus, when contributing to the value of $Q^+$, the low part of the multiplier output in LIU{j} is weighted by $W^j$, and the high par- is weighted by $W^{j+1}$. This means that the full output of the multiplier in LIU{j} is weighted by $W^j$ when contributing to $Q^+$. Since the two inputs to the multiplier in LIU{j} are input signals y and x{j}, respectively, it follows that, in this case:

$$Q^+ = yx\{0\} + yx\{1\}W^2 + yx\{2\}W^2 + yx\{3\}W^3. \qquad (ii)$$

Next, assume that the value of z is 0 and the value of y is 0. In this case, the only contribution to $Q^-$ is from the current value of Q. Within LIU{j}, the value of q{j} can be written as c{j}W+3{j}, where c{j} is made up of the upper two bits of q{j} and s{j} is made up of the remaining bits. Thus, the value of Q can be written as:

$$Q=s\{0\}+(c\{0\}+s\{1\})W+(c(\{1\}+s\{2\})W^2+(c\{2\}+s\{3\})W^3 rW^4.$$

Each c{j} contributes to the new register value in LIU{j}, giving it a weighting of $W^j$ when contributing to Q+. Each s{j} contributes to the register in LIU{j−1}, for j=1, 2, and 3, giving it a weighting of $W^{j-1}$. The value of r contributes to the register in LIU{3}, giving it a weighting of $W^3$. Thus, in this case:

$$Q^-=(c\{0\}+s\{1\})+(c\{1\}+s\{2\})W+(c\{2\}+s\{3\})W^2+rW^3.$$

Observe that this can be written as:

$$Q^+=Q/W, \qquad (iii)$$

where "/" represents integer division with the remainder discarded.

Equations (i), (ii), and (iii) contain all the contributions to the new value $Q^+$. Combining the contributions via superposition, yields:

$$Q^+=z+y(x\{0\}+x\{1\}W+x\{2\}W^2+x\{3\}W^3)+Q/W. \qquad (iv)$$

After the clock pulse, the value of the output signal a of the LIU Array is given by:

$$a^+=Q^+ \% W. \qquad (v)$$

where $a^+$ means the value of a after the clock pulse, and "%" represents the integer modulus operation. In other words, $a^+$ is the remainder when $Q^+$ is divided by W.

Equations (iv) and (v) summarize the operation of the LIU Array when the clock is pulsed.

Analysis of Procedure for Computing General Function

In this section, the operation of the LIU Array during the procedure used to compute the general function will be analyzed. This procedure was described in a previous section. As will be shown, the LIU Array, when used with the procedure, correctly computes the general function.

For the present discussion, only the case when the subtract input signal to the LIU Array is inactive will be analyzed. The case of an active subtract signal will be analyzed later.

The general function is A←(Z+X*Y)% $W^n$, where:

$$Z=z\{0\}+z\{1\}W+z\{2\}W^2+\ldots+z\{n-1\}W^{n-1};$$

$$Y=y\{0\}+y\{1\}W+y\{2\}W^2+\ldots+y\{n-1\}W^{n-1};$$

$$X=x\{0\}+x\{1\}W+x\{2\}W^2+\ldots+x\{m-1\}W^{m-1};$$

$$A=a\{0\}+a\{1\}W+a\{2\}W^2+\ldots+a\{n-1\}W^{n-1};$$

where: m is the number of LIU's in the LIU Array and the number of words in operand X; and n is the number of words in operands Y, Z, and A. The modulus operation "% $W^n$" reflects the fact that the resulting value of Z+X*Y is truncated to fit into the n words of A. If (Z+X*Y)<$W^n$, then A=Z+X*Y; this is the "no overflow" case of the general function. If (Z+X*Y)≧$W^n$, then A consists of the lower n words of Z+X*Y; this is the "overflow" case of the general function.

The procedure for computing the general function was described in a previous section. Combining this procedure with the preceding analysis of the LIU Array, the computation of the general function may be described by the following recursion:

For k=0, 1, . . . , n−1:

$$Q\{k\}=z\{k\}+y\{k\}X+S\{k-1\};$$

$$a\{k\}=Q\{k\} \% W;$$

$$S\{k\}=Q\{k\}/W;$$

where: S{−1}=0; "%" represents the integer modulus operation; and "/" represents integer division with the remainder truncated.

When the n steps of the recursion have been completed, it will be shown that the following equation holds:

$$a\{0\}+a\{1\}W+a\{2\}W^2\ldots+a\{n-1\}W^{n-1}+S\{n-1\}W^n=$$

$$z\{0\}+z\{1\}W+z\{2\}W^2\ldots+z\{n-1\}W^{n-1}+X(y\{0\}+y\{1\}W+y\{2\}W^2\ldots+y\{n-1\}W^{n-1}). \qquad (vi)$$

The right hand side of this equation is Z+X*Y. The left hand side of the equation is A+S{n−1}$W^n$. Applying a "% $W^n$"operation to each side of the equation yields A=(Z+X*Y)% $W^n$. Thus, once equation (vi) has been shown to be true, it will have been shown that the procedure does in fact cause the LIU Array to properly compute the general function.

Equation (vi) may be proved by induction. First it is shown that the equation holds for the case of n=1. Then it is shown that if the equation holds for n=t, it also holds for n=t+1. This establishes that the equation holds for any value of n≧1.

Consider the case that n=1. Since S{−1}=0, we have, from the recursion:

$$Q\{0\}=z\{0\}+y\{O\}X.$$

Notice that, for any k, WS{k}+a{k}=Q{k}, since S{k} is the quotient and a{k} the remainder that results from dividing Q{k} by W. Evaluating this at k=0 gives:

$$a\{0\}+WS\{0\}=Q\{0\}=z\{0\}+y\{0\}X,$$

which establishes equation (vi) for the case of n=1.

Now consider the case of n=t+1. Assuming that equation (vi) holds for n=t, we have:

$$a\{0\}+a\{1\}W+a\{2\}W^2\ldots+a\{t-1\}W^{t-1}+S\{t-1\}W^t=$$

$$z\{0\}+z\{1\}W+z\{2\}W^2\ldots+z\{t-1\}W^{t-1}+X(y\{0\}+y\{1\}W+y\{2\}W^2\ldots+y\{t-1\}W^{t-1}). \qquad (vii)$$

Since WS{k}+a{k}=Q{k}, we also have:

$$W^{t-1}S\{t\}+W^t a\{t\}=W^t Q\{t\}=W^t(z\{t\}+y\{t\}X+S\{t-1\}). \qquad (viii)$$

Adding equations (vii) and (viii) together yields:

$$a\{0\}+a\{1\}W+a\{2\}W^2\ldots+a\{t\}W^t+S\{t\}W^{t+1}=z\{0\}+z\{1\}W+z\{2\}W^2\ldots+z\{t\}W^t+X(y\{0\}+y\{1\}W+y\{2\}W^2\ldots+y\{t\}W^t)$$

This establishes equation (vi) for the case of n=t+1, completing the proof.

Analysis of Active Subtract Signal

When the subtract input signal of the LIU Array is active, each word of operand Z is complemented before it is applied to the LIU Array. Numerically, this is equivalent to replacing z by ($W^n$−Z−1). Similarly, each word of operand A is complemented before it is output from the LIU Array. This is equivalent to replacing A by ($W^n$−A−1). Thus, when the subtract signal is active, the general function is computed as follows:

$Z'=W^n-Z-1;$ $A'=(Z'+X*Y)\% W^n;$ $A=W^n-A'-1.$

Since $0 \leq Z' < W^n$ and $0 \leq A' < W^n$, we are free to append a "% $W^n$" operation to the equations for Z' and A':

$Z'=(W^nZ-1)\% W^n;$ $A'=(Z'+X*Y)\% W^n;$ $A=(W^n-A'-1)\% W^n.$

In this form, it is obvious that the "% $W^n$" operation can be ignored, the equations merged, and the "% $W^n$" operation appended at the end, as follows:

$A=(W^n-((W^n-Z-1)+X*Y)-1)\% W^n.$

Simplifying the equation yields:

$A=(Z-X*Y)\% W^n.$

This is the subtraction form of the general function, as desired.

Single-RAM Apparatus

The LIU Array can be combined with a controller and a random access memory (REM) to form an apparatus capable of performing computations based on the general function described above. Such an apparatus is shown in FIG. 4.

The combination of the controller 41 and LIU Array 39 comprises a coprocessor that can be used with a computing device. In such a case, the random access memory (REM) 42 can be shared with the computing device 11, as in FIG. 1.

The controller 41 manipulates the signals of the LIU Array 39 to cause the array to perform the desired operation. The controller 41 reads input operands from the RAM 42 and transfers them to the LIU Array 39 and the computing device. The controller 41 reads output operands from the LIU Array 39 and writes them to the RAM 42. There are many ways to implement the controller 41, with one way being to use a finite state machine.

The RAM 42 is a conventional device. The RAM has a data bus b bits wide, matching the word size of the LIU Array 39. The controller 41 reads a word from RAM 42 by applying the appropriate value to the address bus, activating the read signal, reading the word's value as supplied by the RAM 42 on the data bus, and then deactivating the read signal. The controller 41 writes a word to RAM 42 by applying the appropriate value to the address bus, applying the word's value to the data bus, and then pulsing the write signal.

The amount of time that it takes to read a word or write a word is called a RAM cycle. For example, when the controller 41 reads or writes an integer X comprised of n words, the time required is n RAM cycles.

The controller 41 causes the apparatus to execute the general function $A \leftarrow Z \pm (X*Y)$, where X~m words, Y~n words, Z~n words, and A~n words, using the following procedure:

1. The controller 41 pulses the clr input of the LIU Array 39.
2. The controller activates or deactivates the subtract input of the LIU Array. The controller holds this value constant for the remainder of the procedure.
3. The controller reads m values from RAM 42 and applies them to the $x\{0\}, x\{1\}, \ldots, x\{m-1\}$ inputs of the LIU Array. The controller holds these values constant for the remainder of the procedure.
4. For j=0, 1, . . . , n−1, do:
    a. The controller reads a value from RAM and applies it to the y input of the LIU Array.
    b. The controller reads a value from RAM and applies it to the z input of the LIU Array.
    c. The controller pulses the clk input of the LIU Array.
    d. The controller reads the value of the a output of the LIU Array and writes it in RAM.

In step 3, the controller 41 reads the m words of the X operand from RAM 42. This requires m RAM cycles.

In step 4a, the controller 41 reads the n words of the Y operand from RAM 42. This requires n RAM cycles.

In step 4b, the controller 41 reads the n words of the Z operand from RAM 42. This requires n RAM cycles.

In step 4d, the controller 41 writes the n words of the A operand to RAM 42. This requires n RAM cycles.

The total number of RAM cycles required for the procedure is m+3n. This is obtained by adding up the cycles in steps 3, 4a, 4b, and 4d.

Single-RAM Apparatus with Read-Modify-Write

Figure 5:
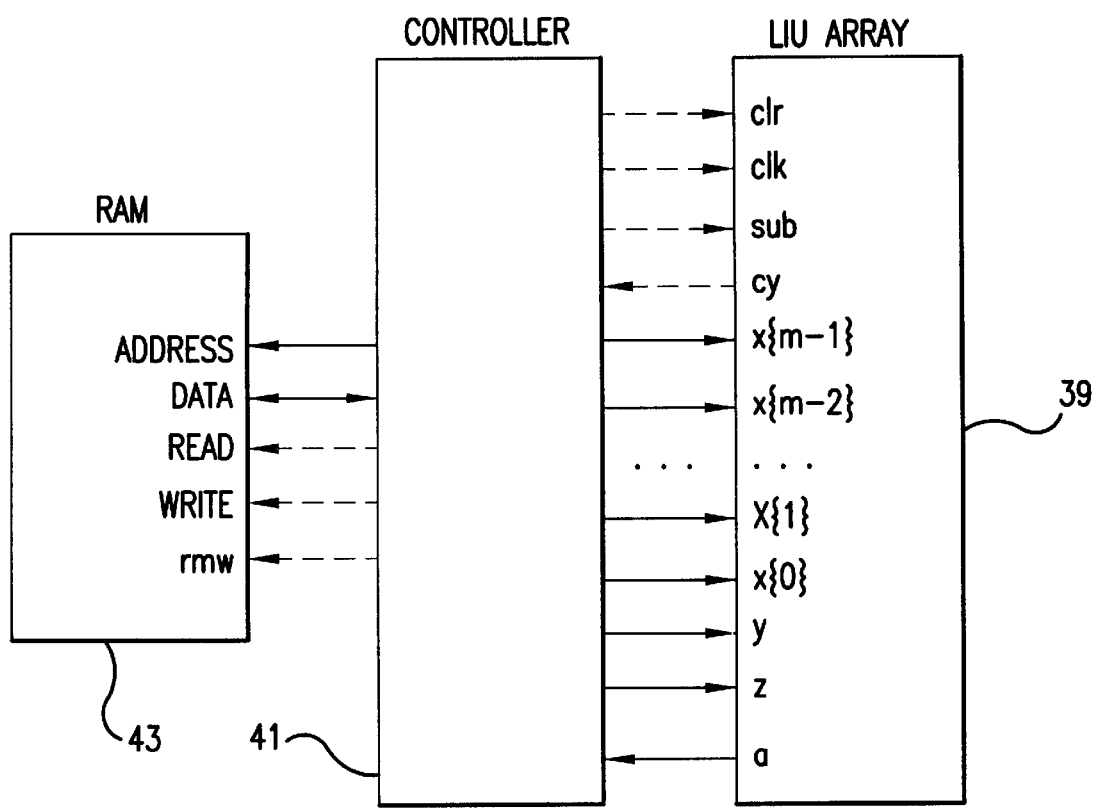
FIG. 5 illustrates an LIU array combined with a controller and RAM having a read-modify-write function.

As shown in FIG. 5, the number of RAM cycles needed to perform the general function can be reduced by using a RAM 43 that is capable of performing a read-modify-write operation. Such an operation allows the controller 41 to read a word from RAM 43, modify the word's value, and write the new value back to REM 43, all in a single RAM cycle.

The combination of the controller 41 and LIU Array 39 comprises a coprocessor that can be used with a computing device. In such a case, the RAM 43 can be shared with the computing device 11, as in FIG. 1.

The controller 41 executes a read-modify-write operation on the RAM 43 as follows. First, the controller applies the appropriate value to the address bus and activates the read-modify-write, rmw, signal. Then the controller activates the read signal, reads the value supplied by the RAM on the data bus, and deactivates the read signal. Then the controller applies the modified value to the data bus and pulses the write signal. Finally, the controller deactivates the rmw signal. The entire operation takes place in a single RAM cycle.

The RAM 43 also has the capability to do the usual read and write operations, as already described. The controller selects the usual read and write operations by deactivating the rmw signal. Each of the three operations—read, write, and read-modify-write—requires a single RAM cycle.

To exploit the read-modify-write capability, the general function becomes $Z \leftarrow Z \pm (X*Y)$, where X~m words, Y~n words, and Z~n words. Thus, the operand Z is modified by adding or subtracting the quantity X*Y. The controller 41 causes the apparatus to execute this function using the following procedure:

1. The controller 41 pulses the clr input of the LIU Array 39.
2. The controller activates or deactivates the subtract input of the LIU Array. The controller holds this value constant for the remainder of the procedure.
3. The controller reads m values from RAM 43 and applies these values to the $x\{0\}, x\{1\}, \ldots, x\{m-1\}$ inputs or the LIU Array. The controller holds these values constant for the remainder of the procedure.
4. For j=0, 1, . . . , n−1, do:
    a. The controller reads a value from RAM and applies it to the y input of the LIU Array.
    b. The controller: reads a value from RAM and applies it to the z input of the LIU Array; pulses the clk signal of the LIU Array; reads the value of the a output of the LIU Array and writes it in RAM.

In step 3, the controller reads the m words of the X operand from RAM. This requires m RAM cycles.

In step 4a, the controller reads the n words of the Y operand from RAM. This requires n RAM cycles.

In step 4b, the controller performs a read-modify-write operation on each of the n words of the Z operand from RAM. This requires n RAM cycles.

The total number of RAM cycles required for the procedure is m+2n. This is obtained by adding up the cycles in steps 3, 4a, and 4b.

Dual-RAM Apparatus

Figure 6:
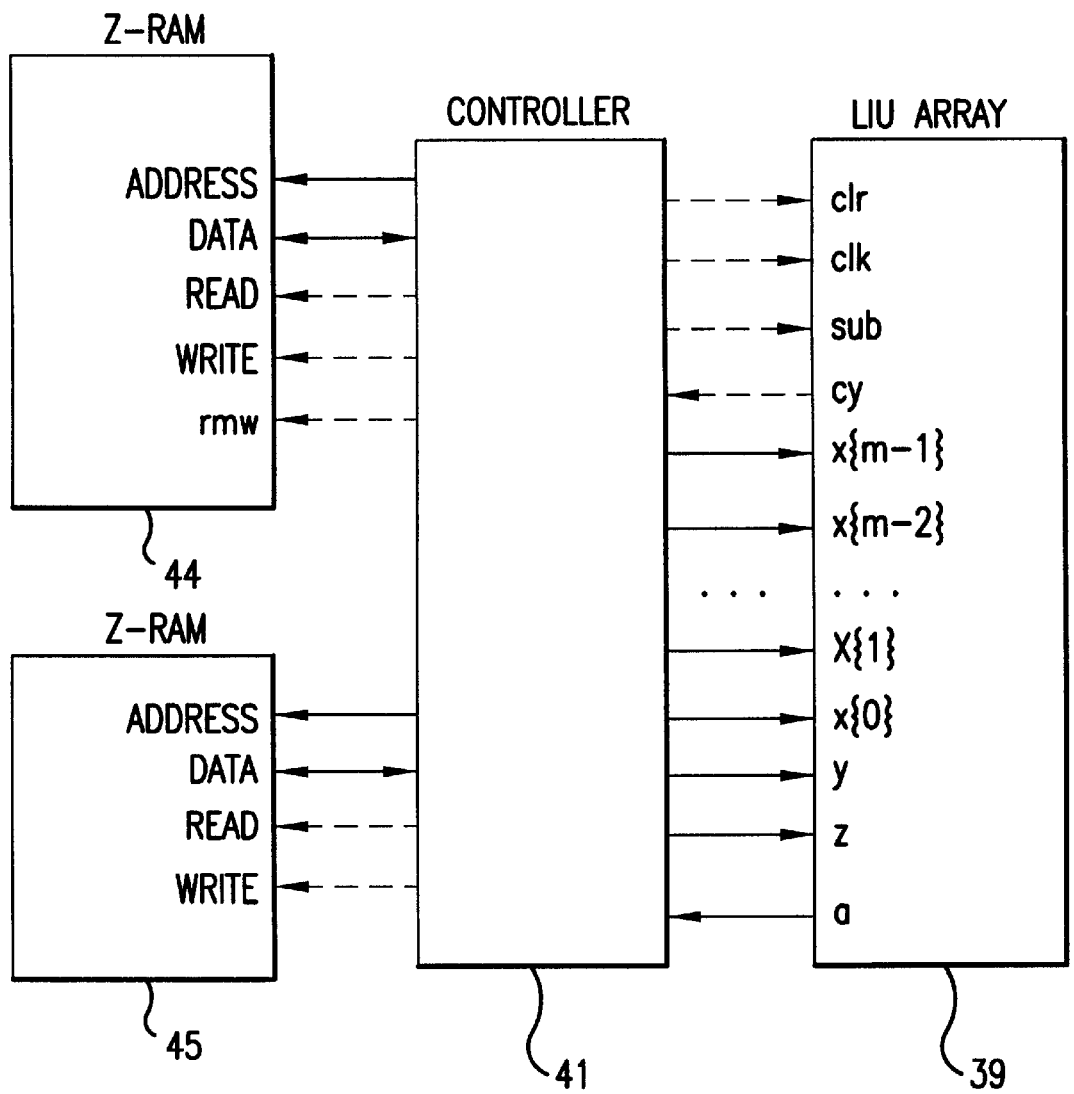
FIG. 6 illustrates an LIU array combined with a controller, a first RAM and a second RAM.

The number of RAM cycles needed to perform the general function can be further reduced by adding a second RAM to the apparatus as shown in FIG. 6. The first RAM 44, called the "Z-RAM," stores the Z operand; the Z-RAM 44 has read-modify-write capability. The second RAM 45, called the "Y-RAM," stores the Y operand; the Y-RAM 45 need not have read-modify-write capability. With dual REM's, the controller 41 is able to simultaneously read a word of the Y operand and read-modify-write a word of the Z operand. The simultaneous operations take place in a single RAM cycle time.

The combination of the controller 41, LIU Array 39, and Z-RAM 44 comprises a coprocessor that can be used with a computing device 11 of FIG. 1. In such a case, the Y-RAM 45 can be shared with the computing device 11, as in FIG. 1.

The dual-RAM apparatus performs the general function, $Z \leftarrow Z \pm (X*Y)$, where X~m words, Y~n words, and Z~n words, using the following procedure:

1. The controller 41 pulses the clr input of the LIU Array 39.
2. The controller activates or deactivates the subtract input of the LIU Array. The controller holds this value constant for the remainder of the procedure.
3. The controller reads m values from the Y-RAM 45 or the Z-RAM 44 and applies these values to the $x\{0\}$, $x\{1\}$, ..., $x\{m-1\}$ inputs of the LIU Array. The controller holds these values constant for the remainder of the procedure.
4. For j=0, 1, ..., n−1, do:
    a. The controller: reads a value from the Y-RAM and applies it to the y input of the LIU Array; reads a value from the Z-RAM and applies it to the z input of the LIU Array; pulses the clk signal of the LIU Array; reads the value of the a output of the LIU Array and writes it in Z-RAM.

In step 3, the controller reads the m words of the X operand from RAM. This requires m RAM cycles.

In step 4a, the controller reads the n words of the Y operand from RAM and performs a read-modify-write operation on each of the n words of the Z operand from RAM. This requires n RAM cycles.

The total number of RAM cycles required for the procedure is m+n. This is obtained by adding up the cycles in steps 3 and 4a.

Pipelined Large Integer Unit

The critical path in the LIU occurs in the first n−1 LIU's in the array as a multiply-accumulate operation. Here the high part-product signal, ph, of the multiplier goes to a summer in the next higher order LIU at a1. The path continues through the summer and leaves that LIU as the sum signal, s, and returns to the original LIU through the second adder signal, a2.

Figure 7:
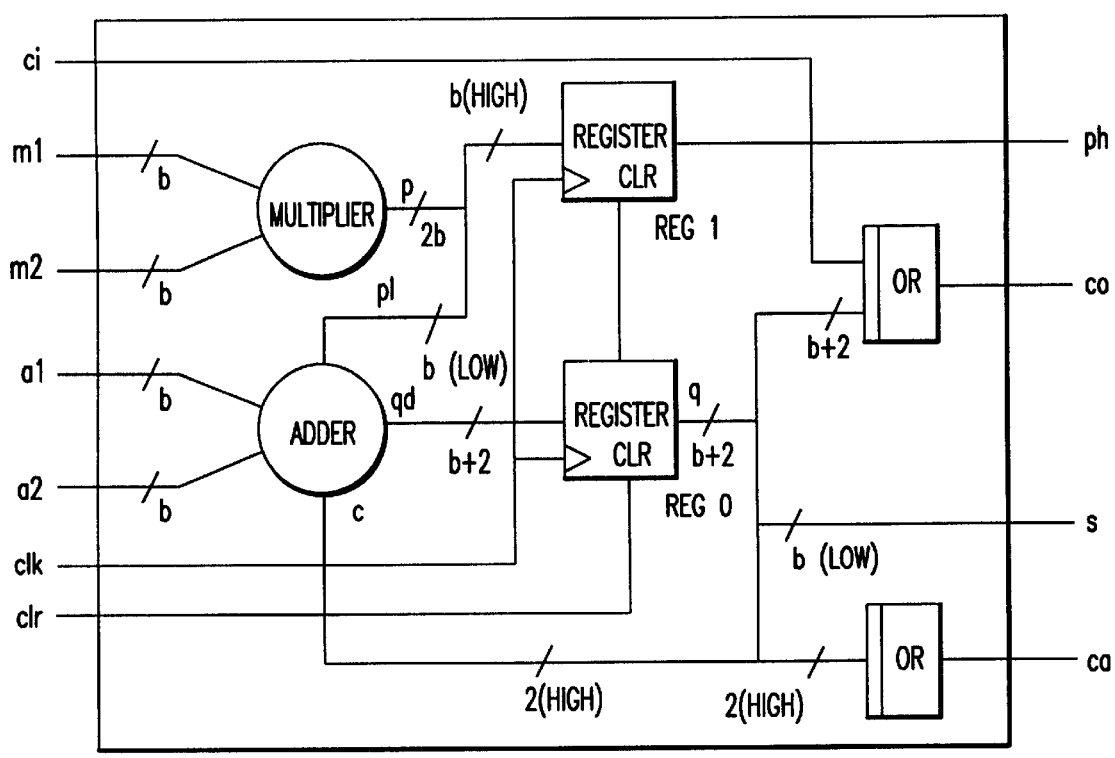
FIG. 7 illustrates a pipelined large integer unit (LIU)

The operating frequency of the LIU can be increased by pipelining the logic. An illustration of a pipelined LIU is show in FIG. 7. By introducing another register, REG1, the delay along the critical path is reduced. The new register is placed on the high part-product signal of the output of the multiplier. This reduces the critical path from a multiplier delay plus a summation delay to just a multiplier delay.

Figure 8:
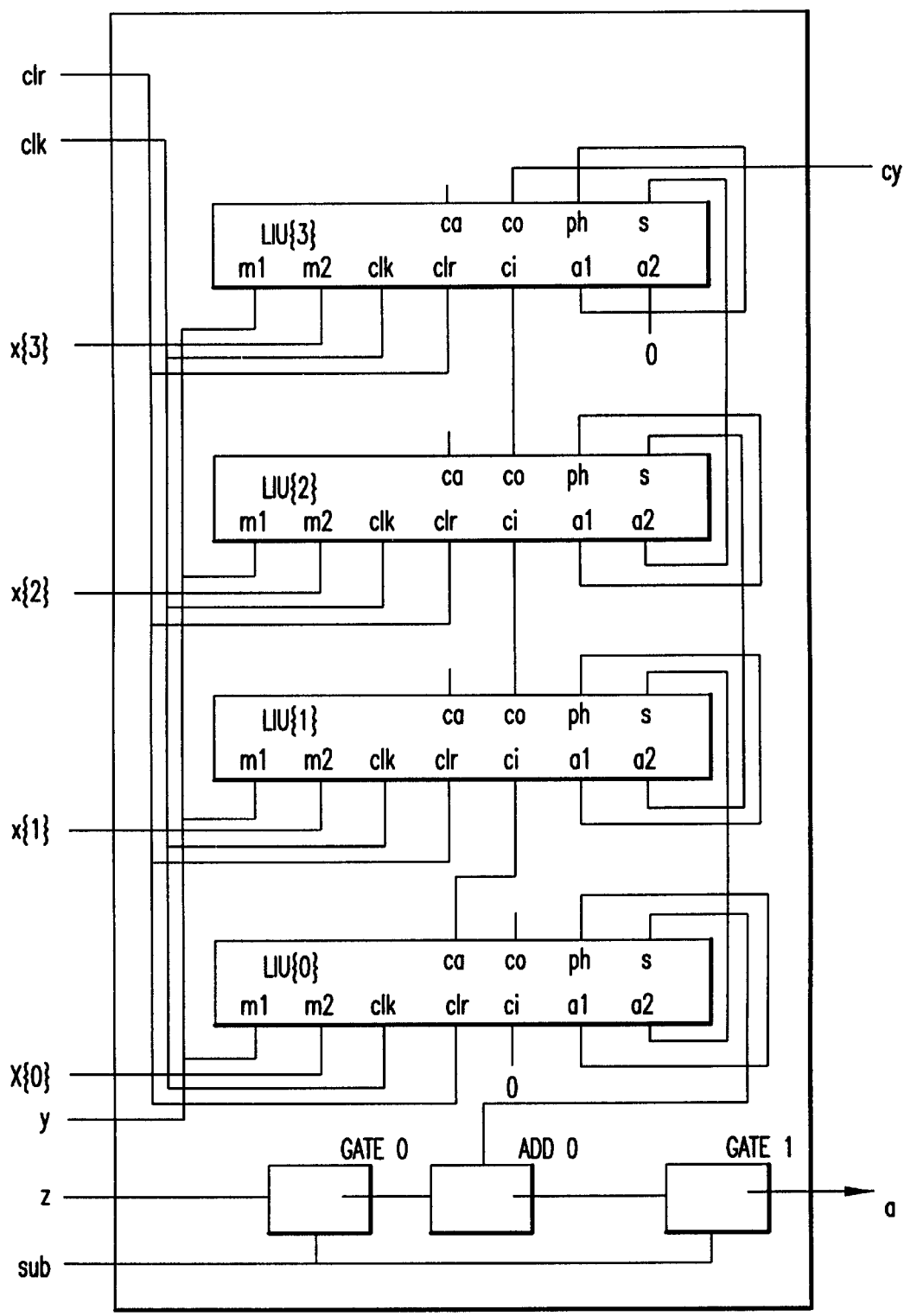
FIG. 8 is a block diagram illustrating four pipelined LIU's interconnected to form an LIU array.

The interconnect of the array changes as a result of this register. The LIU array with pipelined LIU's is shown in FIG. 8. Note that the high part-product signal, ph, of each LIU now feeds back to itself at a1. The signal ph is delayed by one cycle at the first adder signal, a1.

Those familiar with the art recognize that multipliers may be pipelined as well. Each pipeline stage introduces another cycle of latency, which may be more than compensated by an increased operating frequency. Indeed, electronic design automation software is available that optimally places these registers. The controller can be adjusted to advance the computation of X*Y such that $A \leftarrow Z \pm (X*Y)$ may be correctly calculated.

Dual-Ported RAM Apparatus

Figure 9:
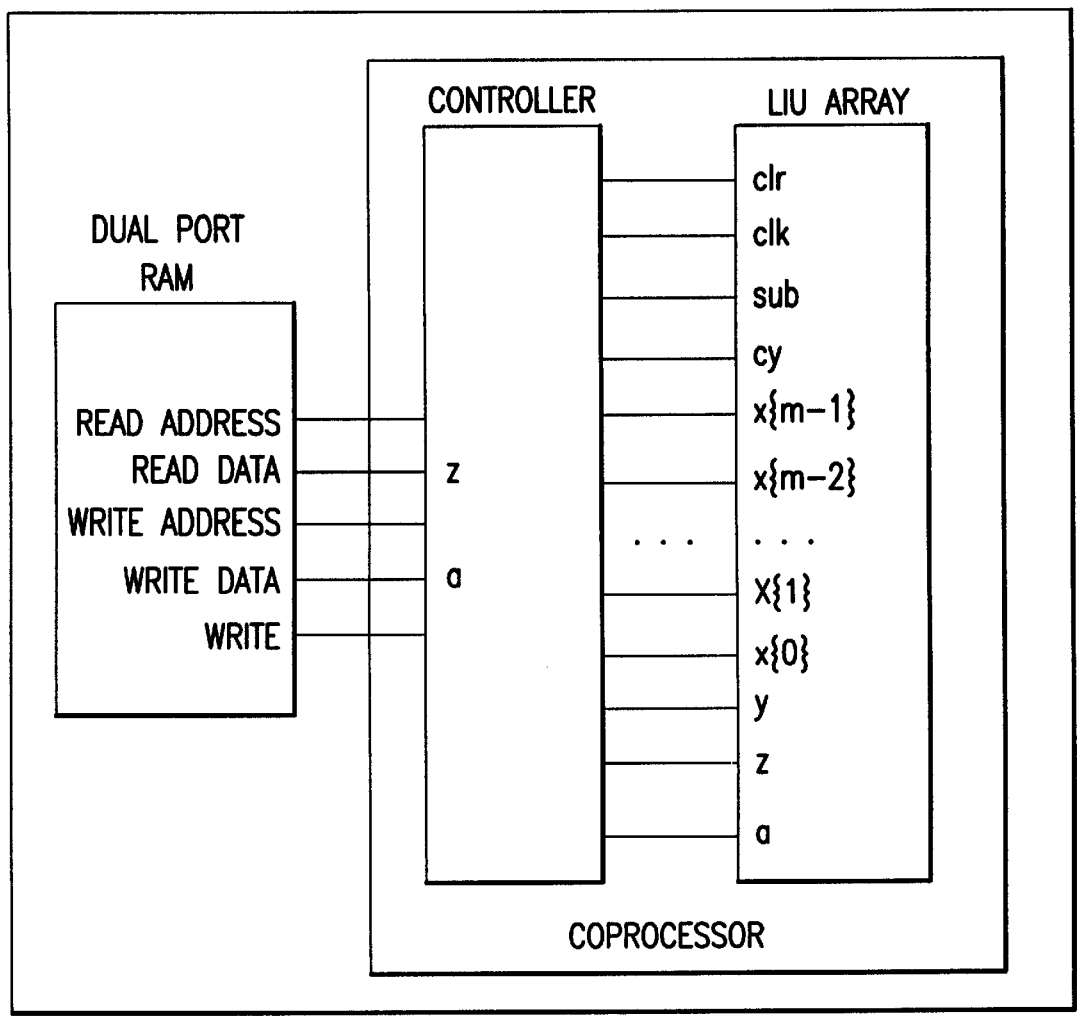
FIG. 9 illustrates a dual-port RAM apparatus.

Besides the multiply-accumulate operation, the other critical oath in the design is the read-modify-write operation. This path can be reduced by substituting a dual-port RAM for the single-ported RAM. Note that this is not a full dual-port RAM, rather a single write-port single read-port RAM. This type of RAM allows one to simultaneously read from one address while writing to a different address. FIG. 9 shows the revised apparatus.

Figure 10:
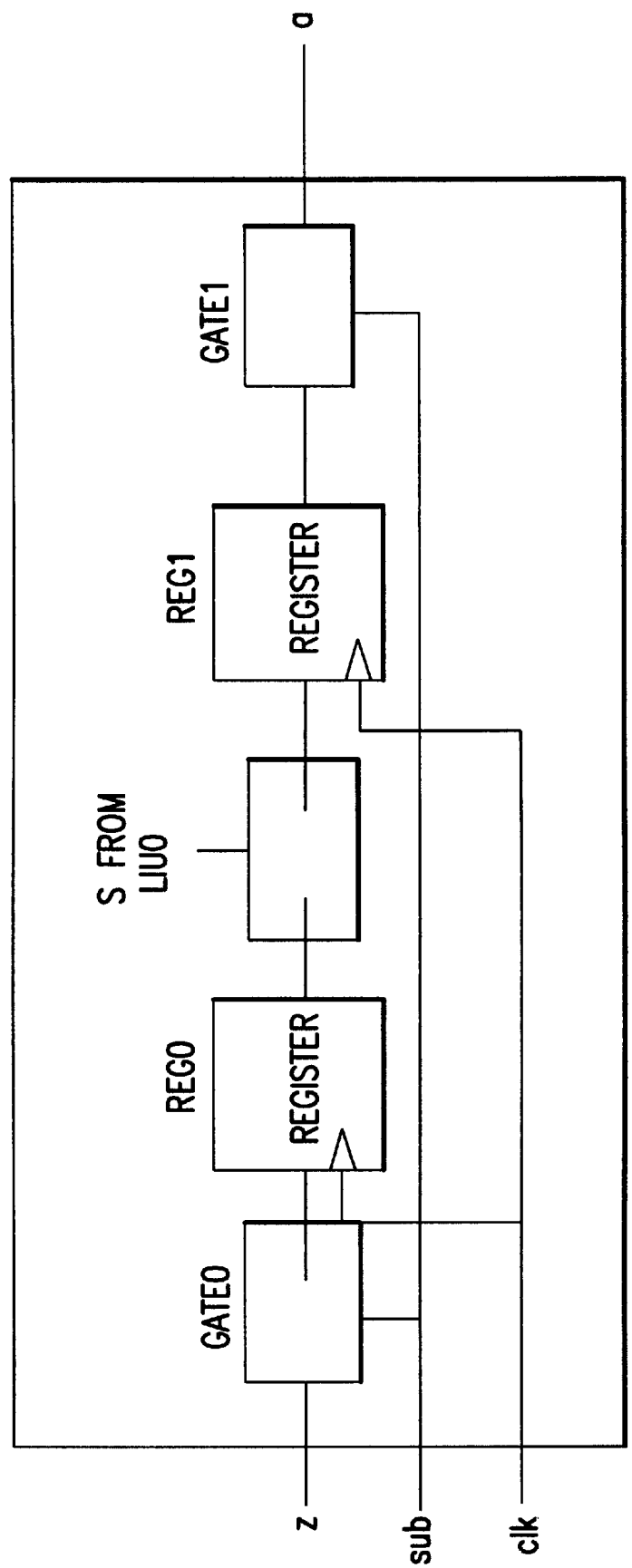
FIG. 10 is a block diagram showing a read-modify-write apparatus for use with a dual-port RAM.

By using a dual-port RAM, the read-modify-write operation can be broken into three parts. This is illustrated in FIG. 10. The first part is the read operation ($Z\{i\}$); the second is the modify operation, which is where ($Z\{i-1\}=Z\{i-1\}+/-X\{i-1\}*Y\{i-1\}$ is formed. The third part is the writing of $A\{i-2\}$ back to the RAM. The read address is never equal to the write address; there is always a difference of exactly two between them. This insures that writing a will not affect the data being read at z. In this manner, each of the three parts has an entire cycle in which to complete, improving the maximum operating frequency considerably.

A viable alternative is to combine the modify and write operations into a single cycle. This reduces the latency by one cycle, and can be as fast for some types of RAM's, as the data to be written to a RAM typically needs to be valid only for the last part the cycle. Again the requirement that the read address and write address be different is met.

Specific Arithmetic Operations

The preceding sections have discussed using the apparatus to perform the general function, $Z \leftarrow Z \pm (X*Y)$, where Y and Z are n-word operands and X is an m-word operand, with m no larger than the number of LIU's in the LIU Array. This function can be specialized to perform arithmetic operations that are useful in multiprecision arithmetic and modular reduction. The specialization is accomplished by the controller manipulating the control and data signals of the LIU Array.

The following discussion presents some examples of such arithmetic operations. These examples are just a few of the operations that can be performed and do not represent all the arithmetic operations that are possible.

Multiply

The apparatus can be used to perform the computation, $$Z \leftarrow X*Y,$$

where: X~m words; Y~k words; Z~n words, $n \geq k$.

Overflow occurs if the value of X * Y is too large to fit within an n-word representation. If $n \geq k+m$, then X * Y will always fit. If n<k+m, then the value of X * Y may or may not fit, depending on the values of X and Y. The value of the cy output of the LIU array at the end of the computation indicates whether or not overflow occurred.

The procedure using the Single-RAM Apparatus is as follows:

1. The controller pulses the clr input of the LIU Array.
2. The controller deactivates the subtract input of the LIU Array and applies 0 to the z input of the LIU Array. The controller holds these values constant for the remainder of the procedure.

3. The controller reads m values from RAM and applies these values to the x{0}, x{1}, ..., x{m−1} inputs of the LIU Array. The controller applies 0 to all other x{ } inputs of the LIU Array. The controller holds these values constant for the remainder of the procedure.

4. For j=0, 1, ..., k−1, do:
   a. The controller reads a value from RAM and applies the value to the y input of the LIU Array.
   b. The controller pulses the clk input of the LIU Array
   c. The controller reads the value of the a output of the LIU Array and writes it to RAM.

5. The controller applies 0 to the y input of the LIU Array. The controller holds this value constant for the remainder of the procedure.

6. For j=k, k+1, ..., n−1, do:
   a. The controller pulses the clk input of the LIU Array.
   b. The controller reads the value of the a output of the LIU Array and writes it to RAM.

The values written to RAM in steps 4c and 6b are the words of the desired result Z.

To see that this procedure gives the correct answer, observe that it is equivalent to computing the general function Z←Z±(X*Y'), where the initial value of Z is an n-word representation of 0, and Y' is an n-word representation of Y.

The procedure for the Single-RAM with Read-Modify-Write Apparatus is identical. The read-modify-write capability does not offer an advantage, since the Z operand is only written, not read.

The procedure for the Dual-RAM Apparatus is similar, except that step 4a takes place simultaneously with step 4c.

A summary of the number of RAM cycles required by each apparatus is provided in Table 6.

TABLE 6

|  | Single-RAM | Single-RAM w/rmw | Dual-RAM |
|---|---|---|---|
| Step 3 | m | m | m |
| Step 4 | 2k | 2k | k |
| Step 6 | n − k | n − k | n − k |
| Total | m + n + k | m + n + k | m + n |

Multiply-accumulate

The apparatus can be used to perform the computation, $$Z \leftarrow Z \pm (X*Y),$$

where: X~m words; Y~k words; and Z~n words, n≥k.

Overflow occurs if the resulting value is too large to fit into n words. Overflow is indicated by an active value on the cy output of the LIU Array at the end of the computation.

The procedure using the Single-RAM Apparatus is as follows:

1. The controller pulses the clr input of the LIU Array.
2. The controller deactivates the subtract input of the LIU Array. The controller holds this value constant for the remainder of the procedure.
3. The controller reads m values from RAM and applies these values to the x{0}, x{1}, ..., x{m−1} inputs of the LIU Array. The controller applies 0 to all other x{ } inputs of the LIU Array. The controller holds these values constant for the remainder of the procedure.
4. For j=0, 1, ..., k−1, do:
   a. The controller reads a value from RAM and applies it to the y input of the LIU Array.
   b. The controller reads a value from RAM and applies it to the z input of the LIU Array.
   c. The controller pulses the clk input of the LIU Array.
   d. The controller reads the value of the a output of the LIU Array and writes it to RAM.
5. The controller applies 0 to the y input of the LIU Array. The controller holds this value constant for the remainder of the procedure.
6. For j=k, k+1, ..., n−1, do:
   a. The controller reads the value of the cy output of the LIU Array. If the value is inactive, the controller terminates the procedure.
   b. The controller reads a value from RAM and applies it to the z input of the LIU Array.
   c. The controller pulses the CLK input of the LIU Array.
   d. The controller reads the value of the a output of the LIU Array and writes it to RAM.

The values written to RAM in steps 4c and 6d are the words of the desired result Z.

To see that this procedure gives the correct answer, observe that it is equivalent to computing the general function Z←Z+(X*Y'), where Y' is an n-word representation of Y.

The procedure may terminate in step 6a before all n words of Z have been replaced with new values. This occurs when the procedure recognizes that replacement values will be identical to the original values. Terminating the procedure reduces the total number of RAM cycles by eliminating cycles that have no effect.

The procedure for the Single-RAM with Read-Modify-Write Apparatus is similar, except that steps 4b and 4d take place in a single read-modify-write cycle, and steps 6b and 6d take place in a single read-modify-write cycle.

The procedure for the Dual-RAM Apparatus is similar to that for the Single-RAM with Read-Modify-Write Apparatus, except that step 4a takes place simultaneously with the read-modify-write cycle of steps 4b and 4d.

A summary of the number of RAM cycles required by each apparatus is provide in Table 7.

TABLE 7

|  | Single-RAM | Single-RAM w/rmw | Dual-RAM |
|---|---|---|---|
| Step 3 | m | m | m |
| Step 4 | 3k | 2k | k |
| Step 6 | ≤ 2(n − k) | ≤ n − k | ≤ n − k |
| Total | ≤ m + 2n + k | ≤ m + n + k | ≤ m + n |

The "≤" symbol reflects the possibility that the procedure may terminate early in step 6a.

Multiply-negate-accumulate

The apparatus can be used to perform the computation, $$Z \leftarrow Z - (X*Y),$$

where: X~m words; Y~k words; and Z~n words, n≥k.

Underflow occurs if the resulting value is negative. Underflow is indicated by an active value on the cy output of the LIU Array at the end of the computation.

The procedure is identical to the procedure for the multiply-accumulate operation, except that the subtract input is activated in step 2, rather than deactivated. The procedure terminates early if it recognized that the replacement values for the words of Z will be identical to the original values. The number of RAM cycles is the same as for the multiply-accumulate operation.

Application to Modular Exponentiation

Let A, B, and P each be integers of n words. Modular exponentiation is the problem of computing $A^B\%P$. A well-known technique for performing modular exponentiation is Montgomery's method. P. Montgomery, "Modular Multiplication without Trial Division," *Mathematics of Computation*, 44 (1985), pp. 519–521. The method is well suited to the present apparatus based on the LIU Array.

This patent is not intended to be a tutorial on Montgomery's method. It is only intended to show how to implement the method using the present invention and to analyze the speed of the implementation in terms of RAM cycles.

Montgomery's method is based on a function called a "Montgomery product." The Montgomery product of two integers, X and Y, with respect to modulus P is defined by:

$$f(X, Y, P) = \{(X*Y*G)\%P\} + kP,$$

where G is an integer that satisfies $(G*W^n)\%P=1$, and k is a small integer. Such an integer G exists if P is odd and does not exist if P is even. Montgomery's method is thus only used for cases where P is odd.

The term "kP" is included to relax the requirement that the value of f( ) be in the range of 0 to P−1. This is desirable for reasons that will become clear later.

A procedure that carries out modular exponentiation using Montgomery's method is as follows:

1. T←$W^{2n}\%P$
2. A←f(T, A, P)
3. T←f(T, 1, P)
4. For each bit in B, most significant first, do:
   a. T←f(T, T, P)
   b. if the bit in B is 1, then T←f(T, A, P)
5. T←f(T, 1, P)
6. T←T%P T is an integer of n words. At the end of the procedure, T contains the value of $A^3\%P$.

The loop in step 4 iterates for each bit in the exponent B. Since B has n words, and each word has b bits, the loop iterates nb times. The Montgomery product in step 4a is calculated for each iteration of the loop. The Montgomery product in step 4b is only calculated if the corresponding bit of the exponent is a 1-bit. If half of the bits in the exponent were 1-bits, then the Montgomery product in step 4b is calculated for half of the loop iterations. With this assumption, the total number of Montgomery products executed during the loop is 1.5*nb.

In public-key cryptography, the number of bits in the exponent is large, typically hundreds or thousands of bits. This means that the exponentiation requires hundreds or thousands of Montgomery product calculations. Thus, the key to calculating the exponentiation quickly is to calculate the Montgomery products quickly.

The apparatus based on the LIU Array of the present invention is capable of calculating Montgomery products efficiently. The following sections describe how this is done.

Steps 1, 2, and 3 are "precomputation" steps, and steps 5 and 6 are "postcomputation" steps. These steps require very little computational effort compared to that of step 4 and can be neglected.

The responsibility for administering the procedure can be shared between the controller and the computing device to which the apparatus is attached as a coprocessor. The system designer has flexibility as to how this responsibility is partitioned. At one extreme, the controller can be designed with enough intelligence to carry out all steps of the procedure, with the computing device merely starting the procedure and providing the controller with the memory locations of operands. At the other extreme, the controller can be designed to handle only the general function Z←Z+(X*Y), with the computing device responsible for building up the Montgomery products and assembling them into modular exponentiation via the above procedure.

Multiprecision Multiplication

The first step in computing the Montgomery product f(X, Y, P) is to compute the product of X and Y. This is the usual "multiply and add" procedure that is taught in grammar school. The resulting product requires 2n words to represent it, where n is the number of words in each of X, Y, and P.

Notation may be agreed upon to ease the wording. Let X be an integer of n words. The notation $X=\{x\{j\}, 0 \leq j < n\}$, may be said to mean that the value of X is $x\{0\}+x\{1\}W+x\{2\}W^2 \ldots +x\{n-1\}W^{n-1}$. "Subintegers" of X, i.e., integer portions of X composed of a subset of consecutive words of X, are operated on. For example, the integer $X'=\{x\{j\}, 2 \leq j < 5\}$ is a 3-word subinteger of X having value $x\{2\}+x\{3\}W+x\{4\}W^2$. The operation X'←X'+1 replaces x{2} by x{2}+1 (assume x{2} is small so this does not overflow). This has the effect of increasing X by $W^2$, since x{2} is weighted by $W^2$ in X.

Let m be the number of LIU's in the LIU Array. Assume that n is a multiple of m. This assumption can be made without loss of generality, since the length of an integer can always be increased by appending 0-words to the high end to make it a multiple of m. The integers Z, $Z_i$ and $X_i$ may be defined as follows:

$$Z=\{z\{j\}, 0 \leq j \leq 2n\};$$

$$Z_i=\{z\{j\}, i \leq j < i+n+m\};$$

$$X_i=\{x\{j\}, i \leq j < i+m\}.$$

Z is an integer of 2n+1 words that is used to hold the computed product. The Z integer is one word longer than it needs to be, for reasons that will be clear in the following section. $Z_i$ is the subinteger of Z having n+m words beginning at z{i}. $X_i$ is the subinteger of X having m words beginning at x{i}.

The product of X and Y can be computed by the following procedure:

1. Z←0
2. i←0
3. While (i<n) do:
   a. $Z_i \leftarrow Z_i+(X_i*Y)$
   b. i=i+m

Step 1 clears Z to 0. Then the loop in step 3 performs "multiply and add." Each iteration of the loop processes m words of the X operand. These words form $X_i$, which is multiplied by operand Y and accumulated into $Z_i$. $Z_i$ is offset within Z by the same number of words that $X_i$ is offset within X. After the last iteration, Z contains the desired product X*Y.

Consider the value of Z after the operation $Z_i \leftarrow Z_i+(X_i*Y)$. The value of Z is $S_i*Y$, where $S_i=\{x\{j\}, 0 \leq j < i+m\}$, since i+m words of X have been processed. $S_i*Y$ fits into n+m+i words. Since $Z_i$ is offset into Z by i words and has length n+m, the operation $Z_i \leftarrow Z_i+(X_i*Y)$ does not overflow.

The loop iterates a total of n/m times. Table 8 shows the number of RAM cycles required by step 3a for each iteration of the loop, and the total number of RAM cycles required.

TABLE 8

|  | Single-RAM | Single-RAM w/rmw | Dual-RAM |
| --- | --- | --- | --- |
| Step 3a | $3m + 3n$ | $2m + 2n$ | $2m + n$ |
| Total | $3n + 3n^2/m$ | $2n + 2n^2/m$ | $2n + n^2/m$ |

It is possible for step 3a to require fewer cycles than shown in the table. This occurs when the cy output of the LIU Array indicates that an early termination is acceptable. In practice, the reduction in cycles due to this effect is only a very small fraction of the total number of cycles required.

Montgomery Reduction

Once the product of 2n words is contained in Z, the second step of the Montgomery product is to reduce it, modulo P, to a value of n words. Montgomery reduction works right to left: an appropriate multiple of P is added to Z in such a way that the rightmost words (i.e., the least significant words) of Z are canceled out.

The reduction requires an integer Q that satisfies:

$$(Q*P) \% W^m = W^m - 1.$$

Q is an integer of m words. Such a Q always exists if P is odd. Computing Q is straightforward. Q is computed once at the beginning of the exponentiation and then used for each reduction step in the exponentiation. Since Q is computed only one time, its computational effort is not significant.

The subinteger, $Z_i$, may be defined in a way different that it was defined in the multiplication step:

$$Z_i = \{z\{j\}, i \leq j \leq 2n\},$$

That is, $Z_i$ is the subinteger of Z beginning at $z\{i\}$ and containing all words of Z to the left of $z\{i\}$, inclusive. $Z_i$ consists of $2n+1-i$ words.

We also need to define an integer V of m words. V is a scratch variable.

The reduction step may be performed using the following procedure:
1. $i \leftarrow 0$
2. While ($i<n$) do:
   a. $V \leftarrow Q*Z_i$
   b. $Z_i \leftarrow Z_i + (V*P)$
   c. $i = i+m$ In each iteration of the loop in step 2, the step 2b clears m words of Z. That is, words $z\{i\}, z\{i+1\}, \ldots, z\{i+m-1\}$ end up having value 0. This clearing operation works as follows:
In step 2a, Q is multiplied by $Z_i$ and the result is placed in V. Since Q and V are each integers of m words, only the least significant m words of $Z_i$ (i.e., $\{z\{j\}, i \leq j < i+m\}$) matter; the other words of $Z_i$ have no effect on the result once it is truncated to m words to fit into V. Thus step 2a is carried out as a "half-multiplication," where two integers of m words are multiplied but only the lower m words of the
In step 2b, V is multiplied by the modulus P and accumulated into $Z_i$. The value of V computed in step 2a is such that this results in the least significant m words of $Z_i$ each having a value of 0. The accumulation into $Z_i$ is guaranteed not to overflow, and with high likelihood, the accumulation terminates early due to the cy output of the LIU Array going inactive. The exact time when termination occurs depends on the data, but because V has m words and P has n words, termination usually occurs after n+m words of $Z_i$ have been accumulated.

The loop iterates a total of n/m times. Table 9 shows the number of RAM cycles required by steps 2a and 2b for each iteration of the loop, and the total number of RAM cycles required.

TABLE 9

|  | Single-RAM | Single-RAM w/rmw | Dual-RAM |
| --- | --- | --- | --- |
| Step 2a | $3m$ | $3m$ | $2m$ |
| Step 2b | $3m + 3n$ | $2m + 2n$ | $2m + n$ |
| Total | $6n + 3n^2/m$ | $5n + 2n^2/m$ | $4n + n^2/m$ |

At the end of the loop the lower n words of Z (i.e, $\{z\{j\}, 0 \leq j < n\}$) have value 0; and the highest word of Z 0(i.e, $z\{2n\}$)) has a value of 0 or 1. If the highest word is 1, it must be cleared by subtracting P from the upper words of Z, as follows:

$$Z_n \leftarrow Z_n - (1*P)$$

Here, the apparatus of the present invention is also used to perform "multiply-negate-accumulate" with one of the operands set to unity. This operation is guaranteed to result in the highest word of Z having value 0. Whether or not the operation is needed (i.e., whether or not $z\{2n\}=1$ prior to the operation) depends on the data. Regardless, the number of RAM cycles involved is negligible compared to the number of cycles needed in the multiplication and reduction loops.

At this point, Z is an integer of 2n words, with the lease significant n words having value 0. To finish off the Montgomery product, perform:

$$Z \leftarrow Z_n / W^n.$$

This is simply a right-shift of the upper n words of Z to the lower n words. The resulting value is an integer of n words; the resulting value is the desired Montgomery product.

The reduction procedure guarantees that Z fits within n words, but it does not guarantee that Z<P. For the purposes of the loop in step 4 of the exponentiation procedure, reducing Z is not necessary beyond what is needed to fit Z within n words. The exponentiation procedure includes the postcomputation step 6 to provide reduction of the final result to a value less than P.

Total RAM Cycles

The results from the previous section for the number of RAM cycles needed in the multiplication and reduction steps are combined in Table 10 into a single result for the Montgomery product. This value is multiplied by 1.5nb to give the total number of RAM cycles needed to compute the modular exponentiation.

TABLE 10

|  | Single-RAM | Single-RAM w/rmw | Dual-RAM |
| --- | --- | --- | --- |
| Montgomery product | $6n(1.5 + n/m)$ | $4n(1.75 + n/m)$ | $2n(3 + n/m)$ |
| Exponentiation | $9n^2b(1.5 + n/m)$ | $6n^2b(1.75 + n/m)$ | $3n^2b(3 + n/m)$ |

The formulas for exponentiation neglect RAM cycles needed during the precomputation and postcomputation steps, i.e., the steps 1, 2, 3, and 5 in the exponentiation procedure. These steps require a very small number of RAM cycles compared to step 4 and can be neglected.

If the operands are large compared to the number of LIU's, then n/m is large. This is often the case for practical public key cryptography applications. In such a case, the number of RAM cycles is approximately $Kbn^3/m$, where K is 9, 6, or 3 for the three apparatus types, respectively. Thus, the total number of RAM cycles is approximately proportional to 1/m; e.g., doubling the number of LIU's reduces the number of RAM cycles by nearly half. The Dual-RAM apparatus requires approximately one third the number of cycles that the Single-RAM apparatus requires, and the Dual-RAM requires about half as many cycles as required by the Single-RAM with Read-Modify-Write apparatus.

It will be apparent to those skilled in the art that various modifications can be made to the computational method and apparatus for multiprecision integer arithmetic of the instant invention without departing from the scope or spirit of the invention, and it is intended that the present invention cover modifications and variations of the computational method and apparatus for multiprecision integer arithmetic provided they come within the scope of the appended claims and their equivalents.

We claim:

1. A method for processing a first data signal, y, with a second data signal, x, using a large integer unit (LIU) array having at least one large integer unit, with each large integer unit having a multiplier, an adder and a LIU register, with the multiplier having a first multiplier input, a second multiplier input, a high part-product output and a low part-product output, with the adder having a first adder input and a second adder input, said adder connected to the multiplier for receiving the low part-product output, said adder for outputting a first sum signal, and with the LIU register connected to said adder for receiving the first sum signal and for outputting a second sum signal, the LIU array having a clear input, a subtract input, a clock input, a data input, z, and a data output, a, the method comprising the steps of:

pulsing the clear input to clear an LIU register and a latching register within the LIU array;

setting the subtract input to one of a logical one for subtraction and a logical zero for addition;

applying a value for the second data signal, x, to the LIU array;

applying a value for the first data signal, y, to the LIU array;

applying a value for the data input, z, to the LIU array;

pulsing the clock input to update the LIU register and the latching register with new value; and reading the data output, a.

2. An apparatus for performing multiprecision integer arithmetic comprising:

a large integer unit (LIU) array of of a plurality of large integer units, the LIU array having a clear input, a subtract input, a plurality of data inputs, x{0}, x{1}, . . . , x{m−1}, a y input, a z input, a clock input and an output, a;

each large integer unit of said LIU array having,
      a multiplier with a first multiplier input, a second multiplier input, a high part-product output and a low part-product output;
      an adder with a first adder input and a second adder input, said adder connected to said multiplier for receiving from the low part-product output, said adder for outputting a first sum signal; and
      an LIU register connected to said adder for receiving the first sum signal and for outputting a second sum signal;

a controller, coupled to said large integer unit (LIU) array, for pulsing the clear input, for selecting one of activating and deactivating the subtract input, for reading and applying m values to the plurality of data inputs, x{0}, x{1}, . . . , x{m−1}, respectively, for reading and applying a y value to the y input, for reading and applying a z value to the z input, for pulsing the clock input, reading an output value, a, and for writing the output value, a, to random access memory; and a random access memory (RAM), coupled to said controller, for storing the m values read by the controller, for storing the y value read by the controller, for storing the z value read by the controller, and for storing the output value, a, written by the controller.

3. An apparatus for performing multiprecision integer arithmetic comprising:

a large integer unit (LIU) of a plurality of large integer units, the LIU array having a clear input, a subtract input, a data input, x, a y input, a z input, a clock input and an output, a;

each large integer unit having,
      a multiplier with a first multiplier input, a second multiplier input, a high part-product output and a low part-product output;
      an adder with a first adder input and a second adder input, said adder connected to said multiplier for receiving from the low part-product output, said adder for outputting a first sum signal; and
      an LIU register connected to said adder for receiving the first sum signal and for outputting a second sum signal;

a controller, coupled to said large integer unit (LIU), for pulsing the clear input, for selecting one of activating and deactivating the subtract input, for reading and applying m values to the data input, x, for reading and applying a y value to the y input, for reading and applying a z value to the z input, for pulsing the clock input, for reading an output value, a, and for writing the output value, a, to random access memory; and a random access memory (RAM), coupled to said controller, for storing the m values read by the controller, for storing the y value read by the controller, for storing the z value read by the controller, and for storing the output value, a, written by the controller.

4. The apparatus for performing multiprecision integer arithmetic as set forth in claim 2 or 3, the random access memory having a read-modify-write capability such that, responsive to the controller, a value is read from random access memory, modified, and written back to random access memory in a single RAM cycle.

5. The apparatus for performing multiprecision integer arithmetic as set forth in claim 2 or 3, the random access memory further comprising:

a first random access memory (RAM) for storing the z value, the first random access memory having read-modify-write capability;

a second random access memory (RAM) for storing the y value; and wherein the controller simultaneously reads the y value and performs a read-modify-write operation on the z value, in a single RAM cycle.

6. The apparatus for performing multiprecision integer arithmetic as set forth in claim 2 or 3, the random access memory having a single write-port and a single read-port such that, responsive to the controller, a first value is read from a first address while, simultaneously, a second value is written to a second address.

* * * * *